United States Patent
Jeansonne et al.

(10) Patent No.: US 11,797,230 B2
(45) Date of Patent: Oct. 24, 2023

(54) BIOS VARIABLES STORAGE

(71) Applicant: HEWLETT-PACKARD DEVELOPMENT COMPANY, L.P., Spring, TX (US)

(72) Inventors: Jeffrey Kevin Jeansonne, Spring, TX (US); Khoa Huynh, Spring, TX (US); Mason Andrew Gunyuzlu, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 111 days.

(21) Appl. No.: 17/550,050

(22) Filed: Dec. 14, 2021

(65) Prior Publication Data
US 2023/0185481 A1  Jun. 15, 2023

(51) Int. Cl.
*G06F 3/06* (2006.01)
*G06F 9/4401* (2018.01)

(52) U.S. Cl.
CPC ............ *G06F 3/0659* (2013.01); *G06F 3/064* (2013.01); *G06F 3/0604* (2013.01); *G06F 3/0631* (2013.01); *G06F 3/0679* (2013.01); *G06F 9/4406* (2013.01)

(58) Field of Classification Search
CPC .... G06F 3/0604; G06F 3/0659; G06F 3/0631; G06F 3/064; G06F 3/0679; G06F 9/4406
See application file for complete search history.

(56) References Cited

U.S. PATENT DOCUMENTS

| | | | |
|---|---|---|---|
| 5,745,418 A | 4/1998 | Ma | |
| 5,893,144 A * | 4/1999 | Wood | G06F 12/0811 711/119 |
| 5,956,473 A | 9/1999 | Ma | |
| 6,904,400 B1 * | 6/2005 | Peri | G11C 16/102 711/170 |
| 7,080,192 B1 | 7/2006 | Wong | |
| 8,782,325 B1 | 7/2014 | Yang | |
| 2012/0124318 A1 * | 5/2012 | Bivens | G06F 12/0646 711/170 |
| 2012/0130204 A1 * | 5/2012 | Basta | G08B 25/005 600/509 |
| 2014/0043890 A1 * | 2/2014 | Kang | G11C 11/1653 365/158 |
| 2014/0283103 A1 * | 9/2014 | Loisel | G06F 21/79 726/26 |

(Continued)

OTHER PUBLICATIONS

Gal, Eran and Toledo, Sivan, Algorithms and Data Structures for Flash Memories, Jun. 2005, ACM Computing Surveys, vol. 37, No. 2, pp. 138-163.*

*Primary Examiner* — Prasith Thammavong
(74) *Attorney, Agent, or Firm* — Knobbe, Martens Olson & Bear, LLP

(57) ABSTRACT

In one example in accordance with the present disclosure, an electronic device is described. The example electronic device includes a NAND flash device to store a static data component of a variable. The example electronic device also includes a NOR flash device to store a dynamic data component of the variable. The electronic device further includes a controller to write the static data component of the variable to the NAND flash device. This controller is also to write the dynamic data component of the variable to the NOR flash device.

20 Claims, 5 Drawing Sheets

(56) References Cited

U.S. PATENT DOCUMENTS

| | | |
|---|---|---|
| 2016/0179430 A1 | 6/2016 | Kong |
| 2018/0203682 A1* | 7/2018 | Yu .......................... G06F 9/4406 |
| 2019/0212999 A1* | 7/2019 | Chen ..................... G06F 9/4406 |
| 2022/0197746 A1* | 6/2022 | Chu .......................... G06F 8/65 |

* cited by examiner

BIOS VARIABLES STORAGE

BACKGROUND

Electronic technology has advanced to become virtually ubiquitous in society and has been used to enhance many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
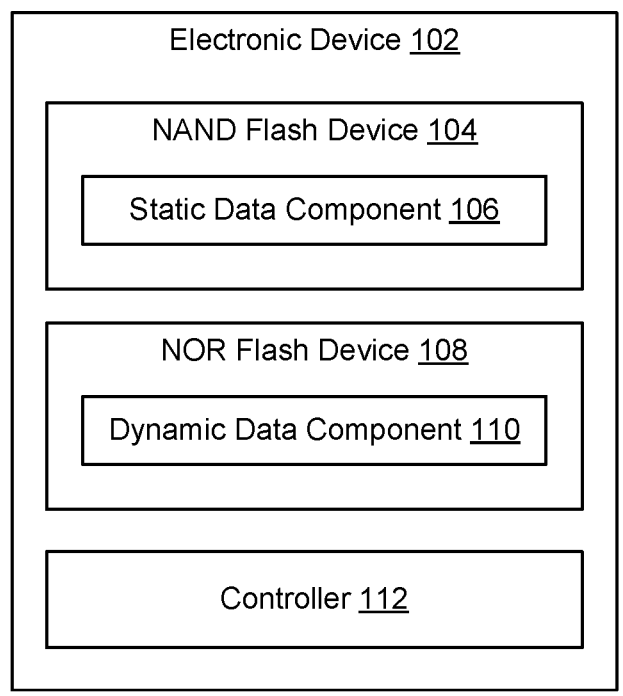
FIG. 1 is a block diagram of an electronic device to store variable data, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, electronic devices may store data on a data storage device. Some examples of data storage devices include flash memory devices. Flash memory is an electronic non-volatile computer memory storage medium that can be electrically erased and reprogrammed. Some examples of flash memory include NOR flash and NAND flash. In some examples, data storage devices store data for variables (referred to herein as variable data).

In some examples, a basic approach to updating variable data in a data storage device is to delete the existing data in storage and then write the new data into storage. While this approach is frequently used in computer systems, there are certain instances where this is not feasible or practical. One example is the Unified Extensible Firmware Interface (UEFI) variable storage region (VSR) located on a NOR flash device. NOR flash devices allow individual bits to be written to 0 but entire blocks of memory are to be erased back to a value of 1. While it is technically possible to erase existing variables in the VSR, erase operations on NOR flash devices are extremely slow, as compared to NAND flash devices. Additionally, NOR devices may withstand a certain number of erase cycles per block (e.g., approximately 100,000 erase cycles) before the NOR device wears out.

To maximize performance and to reduce NOR flash wear out, some strategies to minimize erase cycles may be employed. For example, UEFI variables may contain a header with a byte dedicated to the state of the variable. This state may allow old variables to be marked as invalid by overwriting the existing state byte (e.g., from 3F to 3C) without having to erase the data. However, overwriting an existing state byte is not possible on all types of data storage devices. For example, overwriting an existing state byte does not work on NAND flash devices where data is written once in each sector, with any subsequent change to a sector first involving erasing an entire block of memory before writing to the sector. As used herein, a sector is a unit of memory greater than 1 byte. A "sector" may also be referred to as a page.

In some examples, the price-per-bit for NOR flash is prohibitive to supporting large capacities of data, which in turn restricts the use of NOR flash for applications that involve a large amount of non-volatile data storage. NAND flash may provide a lower cost-per-bit than NOR flash. However, computing component hardware architectures (e.g., system-on-chip (SoC) hardware) may be inherently tied to NOR flash characteristics. Furthermore, NAND flash may provide slower random-access speeds than NOR flash. For example, the input and output (I/O) interface of NAND flash may not provide a random-access external address bus. Rather, with NAND flash, data may be read on a block-wise basis, where block sizes may be hundreds to thousands of bits.

This specification provides examples of a hybrid storage approach that uses NOR flash to maintain compatibility with existing computing architectures (e.g., SoC hardware), but employs NAND flash to provide a large amount of non-volatile storage at a low cost. To enable NOR+NAND hybrid storage solutions that can be used to store variables (e.g., BIOS variables, UEFI variables, etc.), the described examples provide for a variable storage architecture that splits a static data component and dynamic data component for a given variable. In some examples, the static data component may include data for the variable written to a block of memory (e.g., a block of the NAND flash device) that once written is to remain unchanged until the block of memory is entirely erased. In some examples, the dynamic data component may be changeable to indicate a state of the static data component. The dynamic data component may be updatable without an erase operation. For example, individual bits within a dynamic region of the NOR flash device may be overwritten (e.g., from 1 to 0) without performing an erase operation.

In some examples, the static data component for a variable may be stored on a NAND flash device and the dynamic data component for the variable may be stored on a NOR flash device. The dynamic data may be best suited for NOR flash due to the ability of NOR flash to overwrite single bits without performing an erase operation. In some examples, the dynamic data stored on the NOR flash device may be minimized to reduce cost. The static data component may reside on a cheaper storage medium (e.g., NAND flash). Thus, the variable storage architecture examples described herein may allow for moving the majority of variable data storage to a cheaper storage device like a NAND flash device to reduce cost and support more variables.

In some examples, the present specification describes an electronic device that includes a NAND flash device to store a static data component of a variable. The example electronic device also includes a NOR flash device to store a dynamic data component of the variable. The example electronic device further includes a controller to write the static data component of the variable to the NAND flash device. The controller may also write the dynamic data component of the variable to the NOR flash device.

In another example, the present specification also describes an electronic device that includes a NAND flash device to store a static data component for a variable in a static region. The example electronic device also includes a NOR flash device to store a dynamic data component for the variable in a dynamic region. The example electronic device further includes a controller to read the static data component for the variable stored on the NAND flash device based on the dynamic data component for the variable stored on the NOR flash device.

In yet another example, the present specification also describes an electronic device that includes a first data storage device to store a static data component for a variable in a static region that includes a sector of memory. The sector is to remain unchanged once written until a block of memory that includes the sector is entirely erased. The example electronic device also includes a second data storage device to store a dynamic data component for the variable in a dynamic region. The second data storage device to update the dynamic data component at a byte level. The example electronic device further includes a controller to allocate a portion of the second data storage device for the dynamic region based on the static region on the first data storage device.

As used in the present specification and in the appended claims, the term, "controller" may be a processor, a microcontroller unit (MCU), an application-specific integrated circuit (ASIC), a semiconductor-based microprocessor, a central processing unit (CPU), and a field-programmable gate array (FPGA), and/or other hardware device.

The term "memory" may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement the functionality described herein.

As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Turning now to the figures, FIG. 1 is a block diagram of an electronic device 102 to store variable data, according to an example. Examples of an electronic device 102 include a tablet computer, laptop computer, desktop computer, SoC device, internet-of-things device (e.g., sensor), thin client, gaming console, gaming controller, robot, or other computing device that stores variable data.

In some examples, the electronic device 102 may store data for variables. In some examples, the variables may be BIOS variables, Extensible Firmware Interface (EFI) variables, UEFI variables, or other variable used by the electronic device 102. An implementation of UEFI variable storage is non-volatile random-access memory (NVRAM).

In an approach, NVRAM variables may be stored in a shared NOR flash device, where an NVRAM variable has a header and a data section. In this approach, a variable may be a number of bytes and multiple variables may be stored in one (e.g., 4KB) sector. In this approach, when the NVRAM variables are to be updated, the existing NVRAM variable state field in the header is changed to indicate the status of the variable. There may be four different states within NVRAM: "Variable Header Valid Only" (0x7F), "Variable Added" (0x3F), Variable in Transition (0x3E), and "Variable Deleted" (0x3C). NOR flash architecture supports changing bits from a 1 to 0, which allows transitioning from 0x7F (e.g., indicating that the variable is in an active state) to 0x3C (indicating that the variable is in an inactive state) without an erase operation.

However, this approach does not work on NAND flash devices in which a sector of memory is first erased before any bit within that sector can be changed. The examples described herein provide for a hybrid approach where a variable is split into separate static and dynamic components and stored in different data storage devices.

In an example, the electronic device 102 may include a NAND flash device 104 and a NOR flash device 108. A variable may be split into a static data component 106 and a dynamic data component 110. The NAND flash device 104 may be used to store the static data component 106. The NOR flash device 108 may be used to store the dynamic data component 110.

As used herein, the static data component 106 may include data for the variable written to a block of the NAND flash device 104 that once written is to remain unchanged until the block of the NAND flash device 104 is entirely erased. For example, with NAND flash, data may be written once in each sector, with any subsequent change to the written data occurring after the entire block of memory is first erased. The static data component 106 may remain unchanged until the entire block of memory containing the static data component 106 is erased.

In some examples, the electronic device 102 may include a controller 112. In some examples, the controller 112 may write the static data component 106 of the variable to the NAND flash device 104. For example, the controller 112 may write a static data component 106 for a variable in a static region of the NAND flash device 104 that includes a sector of memory. The sector may remain unchanged once written until a block of memory that includes the sector is entirely erased. The static region may be a portion of the NAND flash device 104 that is allocated to store static data for a number of variables. The static region may include a block of memory (e.g., 128 KB) that include a number of sectors of memory (e.g., 512 bytes).

The dynamic data component 110 may include changeable data stored in the NOR flash device 108. For example, the dynamic data component 110 may indicate a state of the static data component 106. In some examples, the state of the static data component 106 may change from an active state to an inactive state. Because the dynamic data component 110 is stored on the NOR flash device 108, the dynamic data component 110 is updatable without an erase operation. For example, individual bits within a dynamic region of the NOR flash device 108 may be overwritten from 1 to 0 without performing an erase operation. It should be noted that with the NOR flash device 108, once a bit is written to 0, an entire block of memory is to be erased before the bit can be erased back to a value of 1.

In some examples, the controller 112 may write the dynamic data component 110 of the variable to the NOR flash device 108. For example, the controller 112 may write the dynamic data component 110 for the variable in a dynamic region on the NOR flash device 108. The dynamic region may be a portion of the NOR flash device 108 allocated to store a dynamic data for a number of variables.

Figure 2:
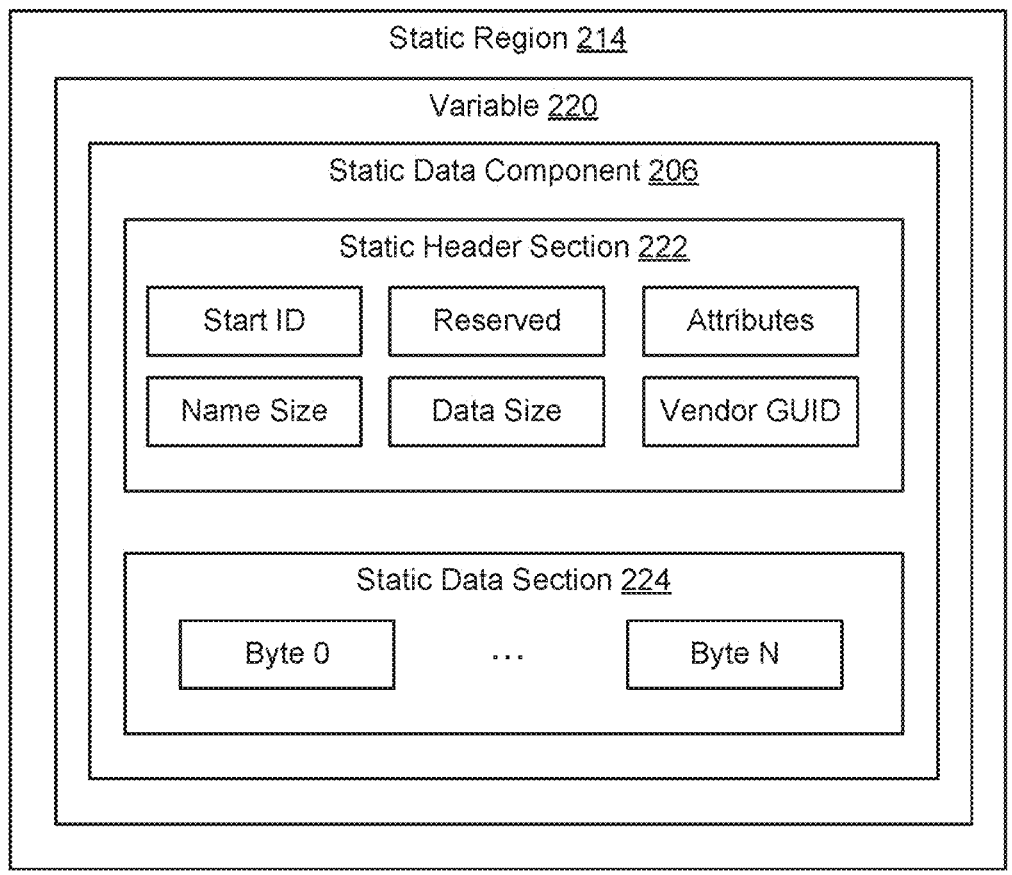
FIG. 2 is a block diagram of a structure to store a variable, according to an example.
Figure 2:
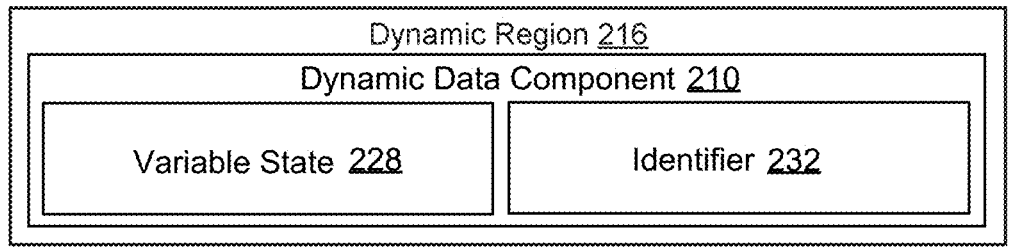

The examples described herein may be used to leverage the NVRAM variable structure. However, a static data component 106 of a variable may be separated from a dynamic data component 110 of the variable to allow the bulk of the variable data to be stored on a NAND flash device 104. FIG. 2 is a block diagram of an example variable structure that separates a static data component 106 of a variable from the dynamic data component 110 of the variable.

Referring momentarily to FIG. 2, a static region 214 is located on a first data storage device (e.g., a NAND flash device). A dynamic region 216 is located on a second data storage device (e.g., a NOR flash device).

The static region 214 may store a static data component 206 of a variable 220. In some examples, the static data component 206 may include a static header section 222 and a static data section 224. In some examples, the static header section 222 may include a number of fields. In some examples, the fields in the static header section 222 may include a Start ID field, an attributes field, a name size field, a data size field, a vendor GUID, and a number of reserved fields. The fields in the static header section 222 may be used to identify the variable 220 and properties about the variable 220. The static data section 224 may include a number of bytes (e.g., byte 0-byte N) that are set to store information for the variable 220.

The dynamic region 216 may include a dynamic data component 210 for the variable 220. In some examples, the dynamic data component 210 may include a state 228 of the variable 220. In some examples, the state 228 may include a unit of memory (e.g., a bit, byte, etc.) that indicates whether the static data component 206 for the variable 220 is active or inactive. For instance, the state 228 may be set to 0×7F when the static data component 206 for the variable 220 is active. The state 228 may be set to 0x3C when the static data component 206 for the variable 220 is inactive. In some examples, the static data component 206 for the variable 220 may be set to inactive when the variable is deleted, updated by another variable 220, or otherwise not to be used by the electronic device.

In some examples, the dynamic region 216 may also include an identifier 232 for the variable 220. In some examples, the identifier 232 may reference the static data component 206 for the variable 220 in the static region 214 on the NAND flash device. For example, the static region 214 may store a number of different variables 220. In some examples, the variable 220 in the static region 214 may be assigned a unique identifier 232 used to match the static data component 206 with the dynamic region 216. The identifier 232 may associate the static data component 206 for a given variable 220 with the state 228 of the static data component 206 for the given variable 220.

Figure 3:
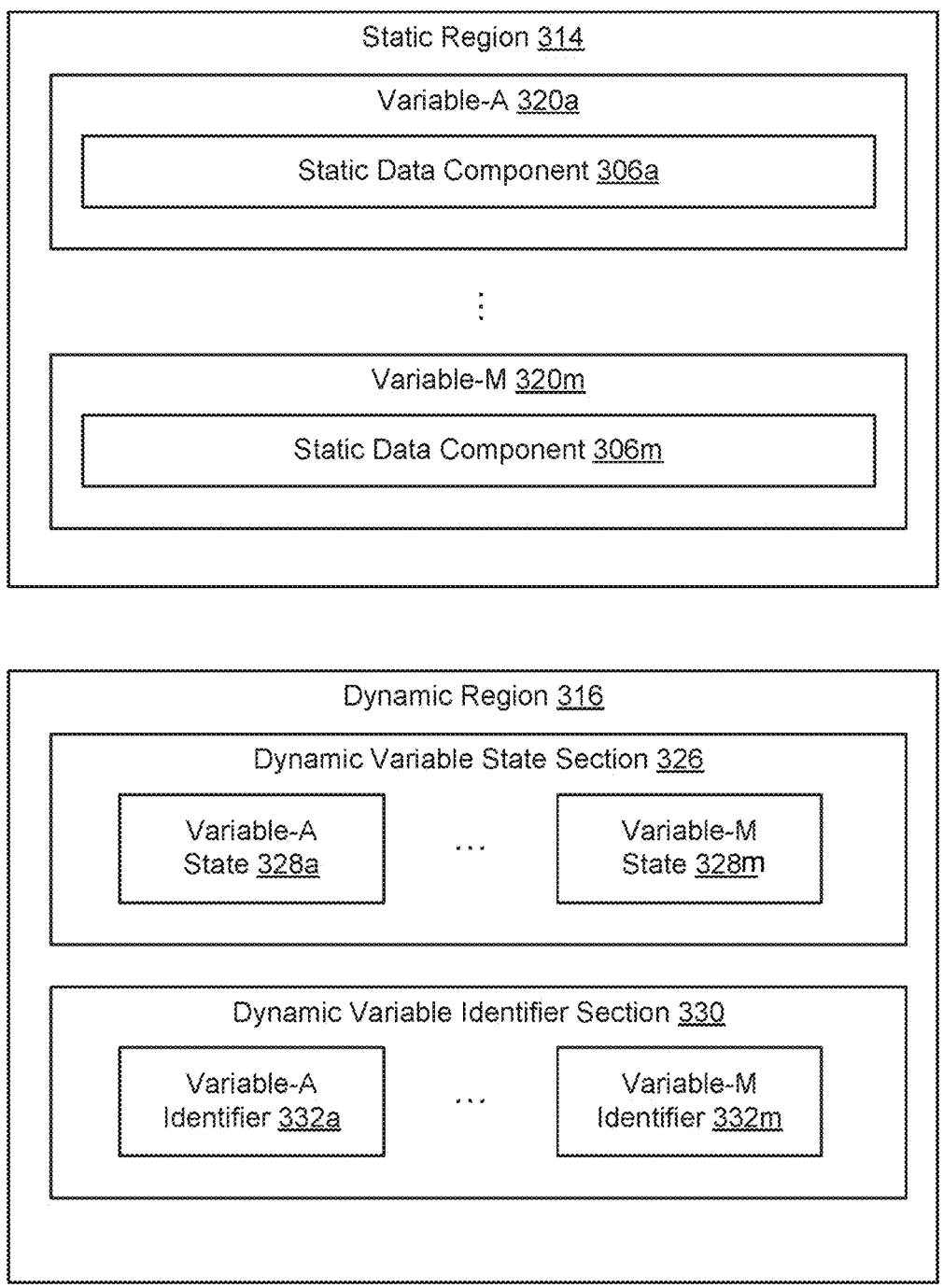
FIG. 3 is a block diagram of a structure for storing multiple variables, according to an example.

FIG. 3 illustrates an example of a structure for multiple variables 320a-m. In this example, the structure described in FIG. 2 may be extended to multiple variables 320a-m. For example, a static region 314 on a NAND flash device stores the static data components 306a-m for variables 320a-m. A variable-A 320a may include a static data component 306a, and so forth through variable-M 320m, which includes static data component 306m.

In some examples, the dynamic region 316 on the NOR flash device includes a dynamic variable state section 326 to store states 328a-m for the variables 320a-m in the static region 314. The states 328a-m may be implemented as described in FIG. 2. For example, a first variable state 328a may indicate whether the static data component 306a for variable-A 320a is active or inactive, a variable state 328m may indicate whether the static data component 306m for variable-M 320m is active or inactive, and so forth.

In some examples, the dynamic region 316 on the NOR flash device includes a dynamic variable identifier section 330 to store identifiers 332a-m for the variables 320a-m in the static region 314. In some examples, a given identifier 332 may reference a given static data component 306 for a variable 320 in the static region 314 on the NAND flash device. For example, a first variable identifier 332a may reference the static data component 306a for variable-A 320a in the static region 314. The variable identifier 332m may reference the static data component 306m for variable-M 320m in the static region 314.

It should be noted that in some cases the value of the identifier 332 may be the same for multiple variables 320. For example, if variable-M 320m is an update to variable-A 320a, then the first variable identifier 332a may be the same as the variable-M identifier 332m. However, in this case, the state 328a of variable-A 320a may be set to "inactive" and the state 328n of variable-M 320m may be set to "active." In this manner, the controller of the electronic device may differentiate between inactive and active versions of the same variable.

Returning to FIG. 1, by separating the static data component 106 and the dynamic data component 110, the static data component 106 may be moved into a higher capacity data storage device such as the NAND flash device 104 to reduce data storage costs, while the dynamic data component 110 may be stored in a more reliable and flexible storage such as the NOR flash device 108. The described hybrid variable data storage approach may be further optimized by defining the states of the stored variables in a manner that reduces erasing the dynamic region to modify the state of any given variable. For example, bits that indicate the state of a given variable may be changed from a 1 to a 0 in the NOR flash device 108 when the variable changes from an active state to an inactive state.

It should be noted that with the described hybrid variable data storage approach, the UEFI variable structure may be extended to applications that utilize extra storage in the NAND flash device 104. For example, features such as embedded controller (EC) variable storage, EC logging, and other use cases using high storage capacity that cannot be met by using NOR flash may be performed using the hybrid NAND flash and NOR flash approach described herein.

In some examples, a write operation for a variable may include updating an existing variable stored in the static region of the NAND flash device 104. For example, the value of a variable may change. In some examples, to update the variable, the controller 112 may append a new static data component (e.g., FIG. 3, 306m) for the variable in the static region on the NAND flash device 104. The controller 112 may also change a corresponding state of the static data component 106 for the variable in the dynamic region on the NOR flash device 108 in response to the variable update. For example, in response to the variable update, the controller 112 may change a state of an existing static data component of the variable in the dynamic region on the NOR flash device to an inactive state.

Figure 4:
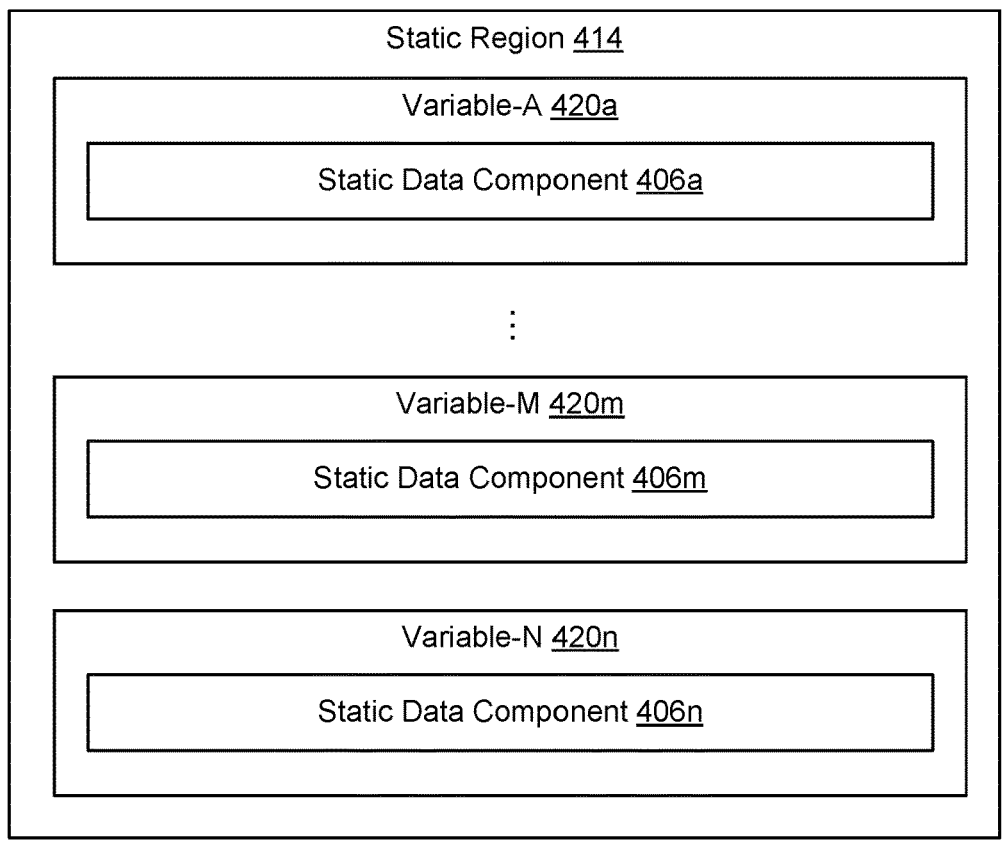
FIG. 4 illustrates an update to a variable, according to an example.
Figure 4:
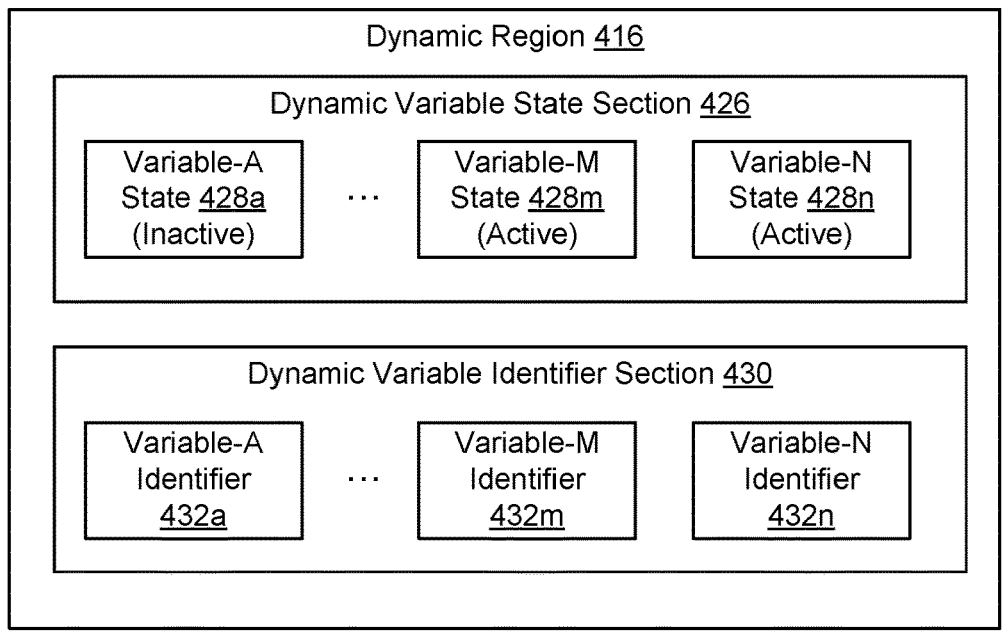

The controller 112 may postpone changing an existing static data component 106 for the variable in the static region on the NAND flash device 104 during the variable update. For example, instead of erasing or modifying an existing static data component 106, the controller 112 may add a new entry for the static data component 106 to the static region on the NAND flash device 104. The controller 112 may change a corresponding state of the existing static data component 106 for the variable in the dynamic region on the NOR flash device 108 to an "inactive" state to reflect that the existing static data component 106 has been replaced. FIG. 4 illustrates an example of how a single variable is updated.

In FIG. 4, a static region 414 may be located on a NAND flash device. The dynamic region 416 may be located on a NOR flash device. The dynamic region 416 may include a dynamic variable state section 426 with states 428*a-n* and a dynamic variable identifier section 430 with identifiers 432*a-n*, as described in FIG. 3.

In the example of FIG. 4, the static region 414 for variable-A 420*a* to variable-M 420*m* may remain unchanged from the example of FIG. 3. However, in FIG. 4, new variable-N 420 may be added to the static region 414 as an update to variable-A 420*a*. An identifier 432*n* may be added to the dynamic region 416 to refer to the new variable-N 420. In this case the state 428*a* for variable-A 420*a* may be modified in the dynamic region 416 to indicate that variable-N 420*n* should be used instead of variable-A 420*a*. In this example, the state 428*a* for variable-A 420*a* may be set to "inactive." The state 428*n* for the new variable-N 420*n* may be set to "active." It should be noted that in this example, variable-M 420*m* is unaffected by the update process. Thus, the state 428*m* for variable-M 420*m* may remain "active."

When reading a variable, the controller may read the static data component for the variable stored on the NAND flash device based on the dynamic data component for the variable stored on the NOR flash device. Reading a variable may be done by using the identifier and state parameters in the dynamic region 416 to locate the desired variable in the static region 414. For example, the controller may receive a request to read a variable that includes the identifier for the variable. To read the variable, the controller may process the dynamic region 416 to find the variable in the static region 414 with a matching identifier. Thus, the controller may find the static data component for the variable in the static region on the NAND flash device based on the identifier in the dynamic region on the NOR flash device.

The controller may determine that the static data component for the variable in the static region on the NAND flash device is active based on the state in the dynamic region on the NOR flash device. For example, the controller may determine that the static data component for the variable in the static region 414 on the NAND flash device is active based on the state in the dynamic region 416 on the NOR flash device.

If the state of the static data component in the dynamic region 416 on the NOR flash device indicates that the static data component for the variable in the static region 414 on the NAND flash device is inactive, then the controller may cycle through the dynamic region 416 on the NOR flash device to find a matching identifier for the variable with an active state. For example, if the variable state in the dynamic region 416 indicates that a variable has been deleted, updated, or otherwise made inactive, the controller may continue to cycle through the dynamic variable identifier section 430 of the dynamic region 416 until the controller finds the matching identifier with an active variable state. The controller may then read the static data component for the variable stored in the static region 414.

In some examples, once the correct (e.g., active) identifier is located, the variable count may be used to reference the variable in the correct location of the static region 414. For example, as the controller increments through the variable identifiers 432*a-n* to find a match to the requested variable, the controller may keep a count of the number of identifiers that preceded the matching identifier. This count may indicate a sector in which the requested variable is stored within the static region 414.

In some examples, the dynamic region 416 may further include an offset value (not shown), which indicates the sector in which the requested variable is stored within the static region 414. In this example, the controller may write the offset value to the dynamic region 416 when a new variable is written to the static region 414. When reading a variable, the controller may look up the offset value for a matching variable to locate the variable in the static region 414.

In the example of FIG. 4, the controller may receive a request to read variable-N 420*n*. As described above, variable-N 420*n* is an update to variable-A 420*a*. Therefore, the identifier 432*a* for variable-A 420*a* has the same value as the identifier 432*n* for variable-N 420*n*. In this example, the controller matches identifier 432*a* to the requested variable. However, the controller determines that the state 428*a* of variable-A 420*a* is inactive. The controller then cycles through the dynamic variable identifier section 430 until the controller matches identifier 432*n* for variable-N 420*n* to the requested variable. In this case, the controller determines that the state 428*n* of variable-N 420*n* is active. The controller then retrieves the static data component 406*n* for variable-N 420*n* from the static region 414.

Figure 5:
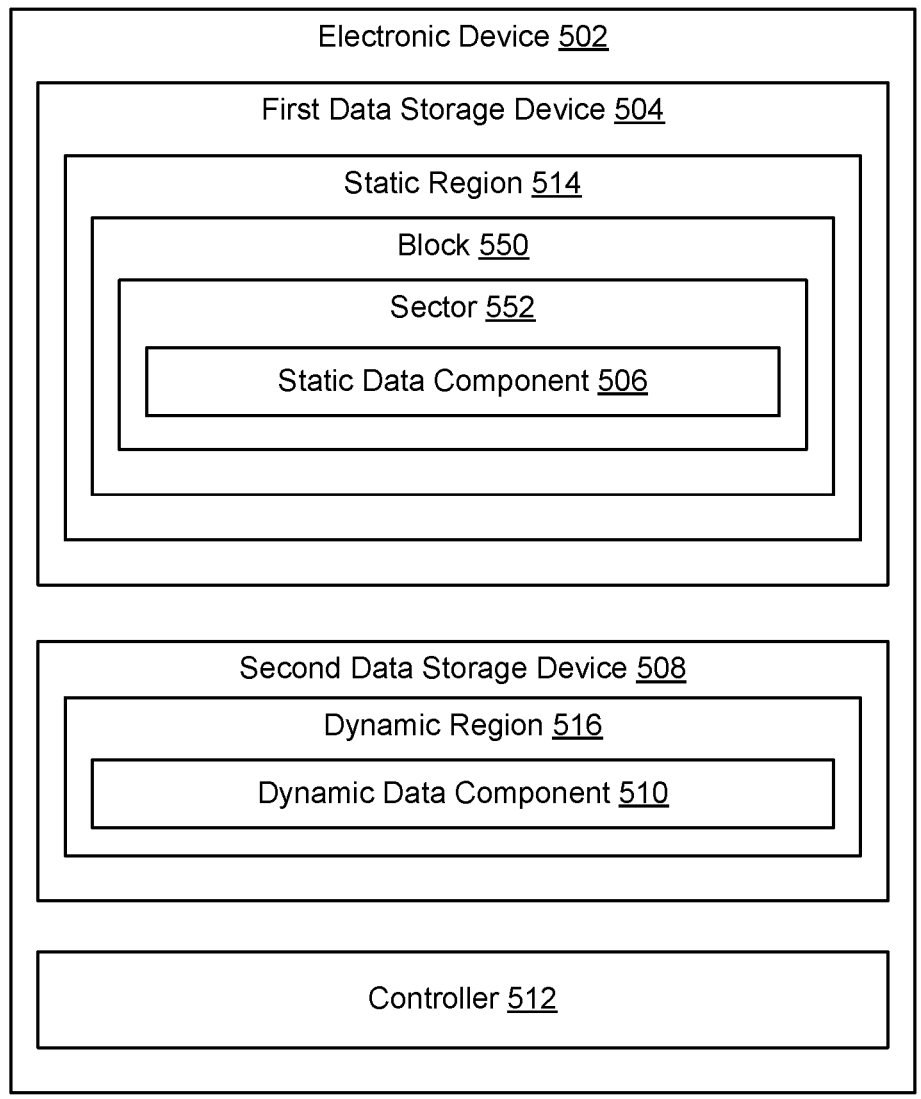
FIG. 5 is a block diagram of an electronic device to allocate a static region and a dynamic region for variable data storage, according to an example.

FIG. 5 is a block diagram of an electronic device 502 to allocate a static region 514 and a dynamic region 516 for variable data storage. In some examples, the electronic device 502 may include a first data storage device 504, a second data storage device 508, and a controller 512.

The first data storage device 504 may store a static data component 506 for a variable in a static region 514. In some examples, the static region 514 may include a sector 552 of memory. The static region 514 may include a number of sectors 552 in a block 550 of memory. A sector 552 may remain unchanged once written until the block 550 of memory that includes the sector 552 is entirely erased. In some examples, the first data storage device 504 may be a NAND flash device. In some examples, the first data storage device 504 may be a device that operates at a sector level (also referred to as a page level) where the sector size (e.g., page size) is greater than 1 byte.

The second data storage device 508 may store a dynamic data component 510 for the variable in a dynamic region 516. The dynamic data component 510 may be updatable without an erase operation. For example, the second data storage device 508 may be a NOR flash device. In this case, individual bits in the dynamic region 516 may be overwritten (e.g., from 1 to 0) without erasing an entire block of memory.

In some examples, the second data storage device 508 may be a device that operates at the byte level. For example, the second data storage device 508 may manipulate an individual byte of information at the byte level. In the case of NOR flash, an individual byte may be overwritten from 1 to 0 without performing an erase operation. In another example, an electrically erasable programmable read-only memory (EEPROM) may be erased or written to at a byte level.

The controller 512 may allocate a portion of the second data storage device 508 for the dynamic region 516 based on the static region 514 on the first data storage device 504. In the case of NAND flash, the static region 514 cannot be written in smaller portions than the size of the sector 552. Therefore, a size of the static data component 506 is an integer multiple (e.g., 1, 2, 3, etc.) of a sector size of the first data storage device 504. In other words, the variable may be a multiple of the sector size of the first data storage device 504. As such, the dynamic region 516 on the second data storage device 508 may contain a variable state (e.g., a state byte) for all sectors 552 in the static region In some examples, the controller 512 may determine a dynamic region size based on a static region block size and a static region sector size. For example, the amount of the second data storage device 508 allocated to the dynamic region 516 may be determined using the following formula:

$$S_{DR} = \frac{S_{SRB}}{S_{SRS} \times N} \quad (1)$$

where $S_{DR}$ is the dynamic region size (bytes), $S_{SRB}$ is the static region block size (bytes), $S_{SRS}$ is the static region sector size (bytes), and N is the number of field sections (e.g., state sections, identifier sections, offset values, etc.) in the dynamic region 516.

In an example, if the static region 514 is implemented using a first data storage device 504 (e.g., a NAND flash device) with 128 KB blocks and 512 byte sectors, and two field sections (e.g., a state section and an identifier section), using Equation (1), the dynamic region 516 on the second data storage device 508 (e.g., a NOR flash device) may be 512 bytes.

In some examples, multiple dynamic regions 516 may be concatenated into a single block on the second data storage device 508. For example, if the dynamic region 516 is implemented using a NOR flash device with 4 KB blocks, a block of the NOR flash device may contain 8 dynamic regions 516.

In some examples, the controller 512 may allocate a block in the second data storage device 508 for a dynamic region cache. In this case, the dynamic region cache may be used to efficiently handle variables that are smaller than the sector size (e.g., 512 bytes) of the first data storage device 504. The controller 512 may allocate a block in the dynamic region 516 for caching small variables. For example, the controller 512 may write a first variable with a size greater than or equal to a static region sector size to the static region 514 on the first data storage device 504. The controller 512 may write a second variable with a size less than the static region sector size to the dynamic region cache. Thus, large size variables may be stored in the static region 514, and small size variables may be stored in the dynamic region cache. The variable state of the variables in the dynamic region cache may be tracked locally in the variable header.

In some examples, after dynamic region cache utilization exceeds the static region sector size, the dynamic region cache data may be flushed to the static region 514. The variable states of the variables that are moved from the dynamic region cache to the static region 514 may be migrated to the dynamic variable state section on the dynamic region 516.

In some examples, moving multiple variables from the dynamic region cache to the static region 514 may result in using more bytes in the dynamic region 516 to track the state of the variables. This may deviate from the assumption described above that the dynamic region 516 contains one byte per sector 552 in the static region 514 as a static region sector 552 may now contain multiple variables. To mitigate the effects of the increased number of variables, the dynamic region 516 may be allocated with additional memory from the second data storage device 508. For example, multiple contiguous dynamic regions 516 may be allocated per static region block 550.

The examples described herein provide methods for distributing a variable (e.g., an EFI NVRAM variable) into two separate regions (i.e., the static region 514 and the dynamic region 516). A variable may include a modifiable dynamic data component 510 and a static data component 506. Once a static data component 506 of a variable is written to the static region 514, writes are performed to the dynamic region 516 (e.g., to update the state of the variable), which postpones subsequent changes to the static data component 506. These examples allow for a NAND flash device to be used in architectures and systems that do not inherently support NAND flash, resulting in increased storage capacity. Furthermore, the described examples of the hybrid variable data storage may enable verbose and sophisticated logging, larger variable storage, new boot architectures and new firmware update methods.

What is claimed is:

1. An electronic device, comprising:
   a hybrid flash memory comprising
      a NAND flash device to store a static data component of a variable; and
      a NOR flash device to store a dynamic data component of the variable; and
   a controller for the hybrid flash memory to:
      split the variable into the static data component and the dynamic data component
      write the static data component of the variable to the NAND flash device; and
      write the dynamic data component of the variable to the NOR flash device.

2. The electronic device of claim 1, wherein the static data component comprises data for the variable written to a block of the NAND flash device that once written is to remain unchanged until the block of the NAND flash device is entirely erased.

3. The electronic device of claim 1, wherein the dynamic data component is changeable to indicate a state of the static data component.

4. The electronic device of claim 1, wherein the variable comprises an Extensible Firmware Interface (EFI) non-volatile random-access memory (NVRAM) variable.

5. The electronic device of claim 1, wherein the variable comprises a Basic Input/Output System (BIOS) variable.

6. The electronic device of claim 1, wherein the controller is to:
   write the static data component for the variable in a static region on the NAND flash device; and write the dynamic data component for the variable in a dynamic region on the NOR flash device.

7. The electronic device of claim 6, wherein the dynamic region on the NOR flash device is to include an identifier and a state of the static data component stored in the static region on the NAND flash device.

8. The electronic device of claim 6, wherein to update the variable, the controller is to:
append a new static data component for the variable in the static region on the NAND flash device; and
change a state of the static data component for the variable in the dynamic region on the NOR flash device in response to the variable update.

9. The electronic device of claim 8, wherein, in response to the variable update, the controller is to change a state of an existing static data component of the variable in the dynamic region on the NOR flash device to an inactive state.

10. The electronic device of claim 8, wherein the controller is to postpone changing an existing static data component for the variable in the static region on the NAND flash device during the variable update.

11. An electronic device, comprising:
a hybrid flash memory comprising
a NAND flash device to store a static data component for a variable in a static region; and
a NOR flash device to store a dynamic data component for the variable in a dynamic region; and
a controller for the hybrid flash memory to split the variable into the static data component and the dynamic data component and to read the static data component for the variable stored on the NAND flash device based on the dynamic data component for the variable stored on the NOR flash device.

12. The electronic device of claim 11, wherein the dynamic region on the NOR flash device is to include an identifier for the variable and a state of the static data component, wherein the identifier references the static data component for the variable in the static region on the NAND flash device.

13. The electronic device of claim 12, wherein the state is to indicate whether the static data component for the variable in the static region on the NAND flash device is active or inactive.

14. The electronic device of claim 12, wherein to read the static data for the variable, the controller is to:
find the static data component for the variable in the static region on the NAND flash device based on the identifier in the dynamic region on the NOR flash device; and
determine that the static data component for the variable in the static region on the NAND flash device is active based on the state in the dynamic region on the NOR flash device.

15. The electronic device of claim 14, wherein if the state of the static data component in the dynamic region on the NOR flash device indicates that the static data component for the variable in the static region on the NAND flash device is inactive, the controller is to:
cycle through the dynamic region on the NOR flash device to find a matching identifier for the variable with an active state.

16. An electronic device, comprising:
a hybrid flash memory comprising
a first data storage device to store a static data component for a variable in a static region comprising a sector of memory, the sector to remain unchanged once written until a block of memory comprising the sector is entirely erased; and
a second data storage device to store a dynamic data component for the variable in a dynamic region, the second data storage device to update the dynamic data component at a byte level; and
a controller for the hybrid flash memory to split the variable into the static data component and the dynamic data component and to allocate a portion of the second data storage device for the dynamic region based on the static region on the first data storage device.

17. The electronic device of claim 16, wherein a size of the static data component is a multiple of a sector size of the first data storage device.

18. The electronic device of claim 16, wherein the controller is to determine a dynamic region size based on a static region block size and a static region sector size.

19. The electronic device of claim 16, wherein the controller is to:
allocate a block in the second data storage device for a dynamic region cache;
write a first variable with a size greater than a static region sector size to the static region on the first data storage device; and
write a second variable with a size less than the static region sector size to the dynamic region cache.

20. The electronic device of claim 19, wherein the controller is to:
determine that utilization of the dynamic region cache exceeds the static region sector size; and
write dynamic region cache data to the static region.

\* \* \* \* \*